Patented Jan. 4, 1949

2,458,421

UNITED STATES PATENT OFFICE 2,458,421

UNSATURATED DERIVATIVES OF ETHYLENE DIAMINE AND POLYMERS THEREOF

Delbert D. Reynolds and William O. Kenyon, Rochester, N. Y., assignors to Eastman Kodak Company, Rochester, N. Y., a corporation of New Jersey No Drawing. Application November 22, 1947, Serial No. 787,607

6 Claims. (Cl. 260—78)

This invention relates to a new group of unsaturated derivatives of ethylene diamine, polymers thereof, and processes for their preparation.

The new compounds may be represented by the structural formula:

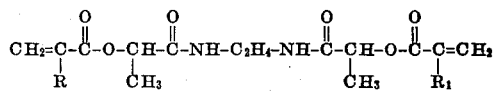

wherein R and $R_1$ each represents the same or different members selected from the group consisting of an atom of hydrogen, a halogen atom (e. g. chlorine or bromine), a cyano group, a saturated alkyl group (e. g. methyl, ethyl, propyl, isopropyl, butyl, etc.), an aryl group (e. g. phenyl, naphthyl, tolyl, xylyl, etc.), an aralkyl group (e. g. benzyl, phenylethyl, etc.), an alkoxy or aryloxy group (e. g. methoxy, ethoxy, propoxy, isopropoxy, butoxy, phenoxy, etc.), a cycloalkyl group (e. g. cyclopropyl, cyclobutyl, cyclohexyl, etc.), an acyl group (e. g. acetyl, propionyl, butyryl, etc.), an acyloxy group (e.g. acetoxy, propionyloxy, butyryloxy, etc.), a heterocyclic group (e. g. piperidyl), a carboxyl group, a carbalkoxy group (e. g. carbmethoxy, carbethoxy, etc.), an amino group (e. g. dimethylamino, diphenylamino, methyl phenylamino, etc.), a diacylamido group (e. g. phthalimido, etc.), and similar groups. The above defined compounds are crystalline substances which have distinct melting points and are capable of isolation in the pure state from their preparation reaction mixtures by the methods commonly employed to separate and purify crystalline products. The monomers are soluble in most of the common organic solvents such as benzene, chloroform, dioxane, etc. They are valuable intermediates in the preparation of other useful chemical compounds. The monomers are, in addition, excellent modifying agents in solution or in compositions designed for impregnating paper and textile fabrics, being capable of polymerization in situ to insoluble resins. The monomers are also polymerizable alone or conjointly with other unsaturated compounds, in the presence of polymerization catalysts, to shaped products which are insoluble in all the common organic solvents. Such polymers can be mechanically worked to finished objects by methods of milling, boring, sawing, etc.

It is, accordingly, an object of the invention to provide unsaturated derivatives of ethylene diamine and polymers thereof. Another object is to provide a method for obtaining the same. Other objects will become apparent hereinafter.

In accordance with the invention, the new unsaturated compounds are prepared by esterifying N,N'-dilactyl ethylene diamine with acrylic or α-substituted acrylic anhydrides or acrylyl chlorides having the general formula:

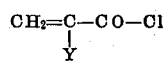

wherein Y represents hydrogen, a halogen atom, a cyano group, a saturated alkyl group, an aryl group, an aralkyl group, an alkoxy or aryloxy group, a cycloalkyl group, an acyl group, an acyloxy group, a heterocyclic group, a carboxyl group, a carbalkoxy group, an amino group or an acylamido group, as previously defined. Where the acid chlorides are employed as the esterifying agents, the reaction is carried out advantageously at a temperature not exceeding 40° C., in an inert solvent medium such as anhydrous benzene, methyl acetate, chloroform, dioxane, etc., and in the presence of an acid-binding agent, for example, anhydrous sodium carbonate, and a dehydrating agent, for example, anhydrous calcium sulfate. This process is described and claimed in copending application, Serial No. 787,605, filed of even date herewith, in the names of Delbert D. Reynolds and William O. Kenyon. Where the acid anhydrides are employed as the esterifying agents, the reaction can be carried out advantageously in the presence of a polymerization inhibitor such as a copper salt, and in the presence of an organic base such as pyridine. The α-substituted acrylic acid chlorides, above defined, may be prepared by treating the corresponding free acids or their esters with thionyl chloride or phosphorus chlorides.

The polymerization of the new unsaturates alone or conjointly with one or more other unsaturated compounds is accelerated by heat and by polymerization catalysts which are known to accelerate the polymerization of acrylic compounds. Exemplary of such catalysts are the organic peroxides (e. g. benzoyl peroxide, acetyl peroxide and lauroyl peroxide), hydrogen peroxide, perborates (e. g. alkali metal perborates) and persulfates (e. g. alkali metal persulfates). The polymerization can be effected in mass or in the presence of an inert diluent such as dioxane. However, the monomers can also be emulsified in a liquid in which they are insoluble (e. g. water) and the emulsion subjected to polymerization. The monomers can also be suspended in water using a relatively poor dispersing agent such as starch, and polymerized in the form of granules. The monomers can also be copolymerized with one or more other ethylenic monomers having the general formulas:

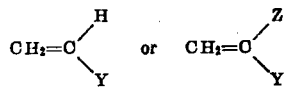

wherein Y and/or Z are alkyl, aryl, aralkyl, alkoxyl, aryloxyl, aralkoxyl, halogeno, acylamido, sulfonamido, sulfamyl, acyloxyl, carbalkoxyl, carbamido, nitrile, aldehydo, heterocyclic, dialkylamino, acylimino, etc. Specific compounds coming within the above formulas include among others propylene, furylethylene, isobutylene, vinyl formate, vinyl acetate, vinyl propionate, vinyl butyrate, vinyl stearate, vinyl thioacetate, vinyl benzoate, vinyl oxalate, isopropenyl acetate, methylene dimethyl malonate, divinyl formal, acrolein, α-methacrolein, vinyl chloride, vinyl bromide, isopropenyl chloride, vinylidene chloride, vinyl chloroacetate, vinyl trichloroacetate, vinyl isocyanate, isopropenyl isocyanate, vinyl acetylene, vinyl urethane, vinyl methyl ketone, vinyl phenyl ketone, vinyl benzyl ketone, vinyl cyclohexyl ketone, vinyl furyl ketone, vinyl p-tolyl ketone, isopropenyl methyl ketone, vinyl methyl ether, vinyl butyl ether, divinyl ether, vinyl phenyl ether, isopropenyl methyl ether, vinyl sulfonamide, vinyl sulphonic acid, vinyl p-tolyl sulphoxide, vinyl β-naphthyl sulphone, vinyl p-tolyl sulphone, isopropenyl methyl sulphone, butadiene, isoprene, chloroprene, 2-acetoxy butadiene-1,3, N-vinyl acetamide, N-vinyl methylacetamide, N-vinyl phenylacetamide, N-vinyl ethylacetamide, N-vinyl methylformamide, N-vinyl acetanilide, N-vinyl p-tolyl acetamide, N-vinyl cyclohexylacetamide, N-vinyl N-methyl butyramide, N-vinyl pyrrole, N-vinyl pyrrolidine, N-vinyl carbazole, vinyl pyridine, vinyl quinoline, styrene, α-methyl styrene, α-chlorostyrene, vinyl phenol, vinyl naphthalene, divinyl benzene, isopropenyl benzene, N-vinyl succinimide, N-vinyl tetrahydrophthalimide, N-vinyl phthalimide, N-vinyl glutarimide, N-vinyl diglycolylimide, N-isopropenyl phthalimide, acrylonitrile, methacrylonitrile, α-methoxyacrylonitrile, α-acetoxyacrylonitrile, α-chloroacrylonitrile, α-phthalimidoacrylinitrile, α-phenoxyacrylonitrile, acrylic acid, methacrylic acid, α-chloroacrylic acid, methyl acrylate, methyl methacrylate, methyl ethacrylate, benzyl acrylate, allyl methacrylate, β-ethoxyethyl acrylate, acrylamide, N-diacetyl acrylamide, N-ethyl acrylamide, N-diethyl acrylamide, etc. Still other unsaturated compounds which can be copolymerized with the new unsaturates of the invention to give valuable resinous products include the esters, amides and nitriles of maleic, fumaric, maleamic, fumaramic, citraconic and itaconic acids. Examples of the latter compounds include methyl maleate, methyl fumarate, dimethyl maleate, dimethyl fumarate, diethyl fumarate, diisopropyl maleate, diisopropyl fumarate, maleamide, fumaramide, itaconamide, maleonitrile, fumaronitrile, citracononitrile, itacononitrile, and similar compounds.

The preferred copolymers of the invention are obtained with starting polymerization mixtures having from 0.2 to 99.8 parts by weight of the new unsaturates and from 99.8 to 0.2 parts by weight of one or more of the other above-mentioned unsaturated organic compounds.

The following examples serve to illustrate further our new unsaturated compounds, polymers thereof, and the process of preparing the same.

*Example 1.—N,N'-dilactyl ethylene diamine*

100 gms. of ethylene diamine (60%) and 400 cc. of benzene were heated together in an azeotropic type still to remove the water. Then 250 cc. of ethyl lactate were added and the still converted to one with a variable take-off head. Upon removal by distillation of the benzene-alcohol azeotrope (boiling point 68° C.), the N,N'-dilactyl ethylene diamine crystallized in the distilling flask. The crystals were dissolved by warming in methanol and then recrystallized three times from this solvent. The melting point of the purified crystals was 178° C. Analysis gave a nitrogen content of 13.8 per cent by weight, which indicated that a substantially pure N,N'-dilactyl ethylene diamine had been obtained.

*Example 2.—N,N'-di(α-methacryloxy propionyl) ethylene diamine*

A mixture of 48 gms. of N,N'-dilactyl ethylene diamine, 100 gms. of methacrylic anhydride, 10 cc. of anhydrous pyridine and some copper carbonate was heated on a steam bath for a period of 18 hours. A crystalline material separated from solution on cooling. The crystals were separated, stirred in water to remove copper salts and methacrylic acid, and then recrystallized twice from ethanol. The purified N,N'-di(α-methacryloxy propionyl) ethylene diamine had a melting point of 171°–172° C. Analysis gave a nitrogen content of 8.30 per cent by weight.

*Example 3.—Poly-N,N'-di(α-methacryloxy propionyl) ethylene diamine*

5 gms. of N,N'-di(α-methacryloxy propionyl) ethylene diamine were dissolved in 200 cc. of acetone by warming on a steam bath. There was then added 0.50 gm. of benzoyl peroxide. In about 10 minutes, an insoluble, white polymer separated out of solution.

*Example 4.—Copolymer of N,N'-di(α-methacryloxy propionyl) ethylene diamine and methyl methacrylate*

(a) 1 gram of N,N'-di(α-methacryloxy propionyl) ethylene diamine, 19 gms. of methyl methacrylate, 0.10 gm. of benzoyl peroxide and 30 cc. of anhydrous dioxane were heated together on a steam bath. In less than 30 minutes, a clear, colorless gel formed, which was insoluble in all the common organic solvents.

(b) 1 gram of N,N'-di(α-methacryloxy propionyl) ethylene diamine, 5 gms. of methyl methacrylate, 0.10 gm. of benzoyl peroxide and 200 cc. of anhydrous dioxane were heated together on a steam bath. A clear, colorless gel formed in less than 30 minutes. This copolymer was insoluble in all the common organic solvents.

*Example 5.—Copolymer of N,N'-di(α-methacryloxy propionyl) ethylene diamine and methyl acrylate*

1 gram of N,N'-di(α-methacryloxy propionyl) ethylene diamine, 19 gms. of methyl acrylate, 0.10 gm. of benzoyl peroxide and 30 cc. of anhydrous dioxane were heated together on a steam bath. A clear, colorless gel formed which was insoluble in all the usual organic solvents.

*Example 6.—N,N'-di(α-acryloxy propionyl) ethylene diamine*

47 gms. of N,N'-dilactyl ethylene diamine, 160 gms. of acrylic anhydride, 10 cc. of anhydrous pyridine and 5 gms. of copper carbonate were heated together under reflux on a steam bath for one hour. The resulting homogeneous reaction mixture was cooled and then dissolved in chloroform. The chloroform solution was washed with water and then with a solution of potassium carbonate, and finally with water. The chloroform layer was separated and dried over a mixture of anhydrous calcium sulfate and anhydrous potassium carbonate. After filtering, the chloroform was removed under vacuum and the resulting product used for the preparation of resinous polymers. In place of the acrylic anhydride in the above example, there may be employed an equivalent amount of ethacrylic anhydride to obtain the compound, N,N'-di(α-ethacryloxy propionyl) ethylene diamine.

*Example 7.—Poly-N,N'-di(α-acryloxy propionyl) ethylene diamine*

10 gms. of N,N'-di(α-acryloxy propionyl) ethylene diamine were dissolved in 100 cc. of dioxane containing 100 mgms. of benzoyl peroxide and the solution heated on a steam bath. In about one hour, a white polymer had formed, which was separated from the dioxane and washed by refluxing in methanol. The polymer was finally washed in ether and dried. It was insoluble in all common organic solvents.

*Example 8.—Copolymer of N,N'-di(α-acryloxy propionyl) ethylene diamine and ethyl acrylate*

12 gms. of ethyl acrylate, 2 grams of N,N'-di(α-acryloxy propionyl) ethylene diamine and 100 mgms. of benzoyl peroxide were heated together in a sealed tube at 50° C. for a period of 18 hours. A soft, clear polymer formed, which was insoluble in all common organic solvents.

*Example 9.—Copolymer of N,N'-di(α-acryloxy propionyl) ethylene diamine and methyl methacrylate*

12 parts by weight of methyl methacrylate, 2 parts by weight of N,N'-di(α-acryloxy propionyl) ethylene diamine and 0.10 parts by weight of benzoyl peroxide were mixed together and heated in a sealed tube at 50° C., for a period of 18 hours. A clear, hard polymer formed which was insoluble in all common organic solvents.

*Example 10.—Copolymer of N,N'-di(α-acryloxy propionyl) ethylene diamine and styrene*

5 parts by weight of styrene, 1 part by weight of N,N'-di(α-acryloxy propionyl) ethylene diamine and 0.05 part by weight of benzoyl peroxide were mixed and heated in a sealed tube at 50° C., for a period of 18 hours. A clear polymer formed which was insoluble in all the common organic solvents.

When completely polymerized, all the homopolymers and copolymers made from our new unsaturated compounds are insoluble in all the common organic solvents, indicating thereby a definite cross-linking property of these new compounds. However, the two ethylenically unsaturated groups of the new compounds are separated by 12 atoms so that the effect is to produce copolymers wherein the molecule chains have longer cross-links, which allows greater movement between molecule chains so cross-linked, than is the case of molecule chains linked together by means of shorter cross-links. Accordingly, the new copolymers possess the advantage of being insoluble in common organic solvents, and yet, they remain sufficiently tough and flexible for easy shaping by mechanical means. The new unsaturated derivatives of ethylene diamine in monomeric form, alone or admixed with one or more other monomeric unsaturated compounds such as those previously mentioned can be employed in solution in an organic solvent or in suspension in a carrier medium such as water, and containing other materials such as a polymerization catalyst, and if desired, also containing filling materials, etc., to impregnate or coat paper, textile materials such as threads, fibers, cellulose and synthetic fabrics, etc., followed by heating the material to the temperature at which the impregnating or coating composition polymerizes. The materials so treated are rendered proof against aqueous solutions and organic solvents. The new unsaturated monomeric derivatives of ethylene diamine, admixed or not with one or more of the other unsaturated compounds capable of copolymerizing therewith, can also be polymerized in a mold to a shaped object such as a thread, an article, etc., and subsequently finished to final shape by mechanical means such as sanding, polishing, milling, sawing, boring, etc.

We claim:

1. A compound having the general structural formula:

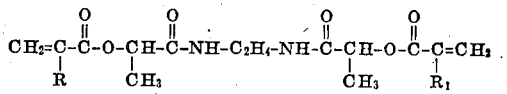

wherein R and R₁ each represents a member selected from the group consisting of an atom of hydrogen, a halogen atom, a cyano group, an alkyl group, an aryl group, an aralkyl group, an alkoxy group, an aryloxy group, a cycloalkyl group, a carboxylic acid acyl group, a carboxylic acid acyloxy group, a piperidyl group, a carboxyl group, a carbalkoxy group, and an amino group.

2. N,N'-di(α-methacryloxy propionyl) ethylene diamine.

3. N,N' - di(α-acryloxy propionyl) ethylene diamine.

4. N,N'-di(α-ethacryloxy propionyl) ethylene diamine.

5. A polymer of a compound having the general structural formula:

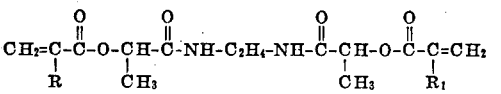

wherein R and R₁ each represents a member selected from the group consisting of an atom of hydrogen, a halogen atom, a cyano group, an alkyl group, an aryl group, an aralkyl group, an alkoxy group, an aryloxy group, a cycloalkyl group, a carboxylic acid acyl group, a carboxylic acid acyloxy group, a piperidyl group, a carboxyl group, a carbalkoxy group, and an amino group.

6. A copolymer of from 0.2 to 99.8 parts by weight of N,N'-di(α-acryloxy propionyl) ethylene diamine and from 99.8 to 0.2 parts by weight of methyl methacrylate.

DELBERT D. REYNOLDS.
WILLIAM O. KENYON.

REFERENCES CITED

The following references are of record in the file of this patent:

UNITED STATES PATENTS

| Number | Name | Date |
| --- | --- | --- |
| 2,141,546 | Strain | Dec. 27, 1938 |
| 2,311,548 | Jacobson et al. | Feb. 16, 1943 |